United States Patent Office 2,915,402
Patented Dec. 1, 1959

2,915,402

FOOD PRODUCT

Joseph H. Cohen, Brookline, Mass., assignor to General Foods Corporation, New York, N.Y., a corporation of Delaware No Drawing. Application December 23, 1955
Serial No. 554,943

6 Claims. (Cl. 99—130)

This invention relates to gelatin dessert compositions which on solution in water have a decreased setting time.

Gelatin desserts are prepared by dissolving the gelatin and other ingredients in water and cooling the solution to cause gelation. Generally, the gelatin is dissolved in hot water and the solution placed in a refrigerator 3–4 hours for gelation. Because of the long period of time required for gelation to occur, it becomes desirable to provide a gelatin dessert composition which can be used to form a gel within a short period of time.

Many attempts have been made to shorten the setting time required. The most successful of these involves the use of an "ice cube" technique. This involves a solution of gelatin dessert composition in ½ the required amount of water at a temperature of 90°–100° C. The additional water required is then added in the form of ice. The melting of the ice provides the additional water required, and at the same time the solution is rapidly cooled to refrigerator temperatures. This technique reduces the setting time to as little as 40 minutes. This procedure provides a considerable reduction in setting time, but further reduction is very desirable from the standpoint of convenience.

It has long been known, of course, that the use of increased amounts of gelatin materially decreases the time required for a gelatin dessert to set. This procedure, however, has the shortcoming that the resulting gel, particularly after a period of standing, is much stronger than desired and becomes tough and rubbery.

It is an object of the present invention to decrease the time required for a gelatin dessert to set to as little as 5 minutes.

It has now been found that the time required for the formation of a gelatin gel can be materially decreased through the use of an excess amount of gelatin as aforementioned without the disadvantages of the gel becoming tough and rubbery, by employing a proteolytic enzyme in combination with the excess gelatin.

In the process of formulating gelatin dessert compositions, many variables in the ingredients must be taken into account. Characteristics of the gelatin, particularly those of viscosity and Bloom, vary according to the source of the gelatin and process of extraction. The gelatins ordinarily used in gelatin desserts are mixtures of various types of gelatin and in order to properly regulate the gel strength of the gelatin dessert, the amount of gelatin to be used per package is determined empirically for each batch of gelatin.

Methods of measuring the gel strength of a gelatin gel are described in Industrial and Engineering Chemistry, Analytical Editions, volume II, page 348, and volume XVII, page 64. The article in volume II defines the gel strength in terms of the weight required to depress a ½" diameter plummet 4 mm. into the gelatin gel which has been prepared under certain specified conditions in a standard size vessel. The article in vol. XVII describes a modification of this procedure which is more suitable in measuring weak gels, such as those of gelatin desserts. Where the term "Dessert Bloom" is employed throughout the remainder of the specification, the value is obtained by following the method described in the above articles, modified by changing the rate of flow of the shot to 40 gms. in 5 seconds, according to the second article, and by employing a plummet of ⅝" diameter. In all other respects, the procedure is the same.

In determining the gel strength of commercial gelatin, the first procedure described in volume II is employed. Gelatin is sold according to the values thus obtained. Where the term "Standard Bloom" is used throughout the specification and claims, the values are obtained by using this standard procedure.

It is generally desired that the amount of gelatin used provide a gel of approximately 18 Dessert Bloom after 18 hours of storage at 10° C. This amount of gelatin is termed a "package load weight" in the art, and for convenience, will be so designated throughout. The approximate Dessert Bloom range within which a gelatin dessert is considered acceptable is from 9 to 26. A Dessert Bloom of less than 9 indicates either incomplete formation of a gel or an extremely weak gel which is unable to support itself. Dessert Bloom of more than 26 indicates a tough, rubbery gel which is considered unpleasant to eat.

The amount of gelatin which is used according to this invention in a gelatin dessert composition is an amount in excess of the 1.0 package load weight described above. Increasing amounts provide a corresponding decrease in the time required for the gelatin dessert to gel. For example, under standard conditions, a gelatin dessert containing 2.0 package load weights of gelatin when prepared in the conventional manner requires only 105 minutes to set as compared with the 180 minutes setting time of a dessert containing the usual 1.0 package load weight. The high load weight gel has an unacceptably high Dessert Bloom after 18 hours standing in refrigerator temperatures (10° C.). While the gelatin dessert containing 1.0 package load weight of gelatin has a Dessert Bloom of 18 after 18 hours of storage, the gelatin dessert containing 2.0 package load weights of gelatin has a Dessert Bloom of 62 after the same period under the same conditions.

This same principle applies with all types of gelatin, regardless of the technique employed in preparing the gelatin dessert. The above discussion has been devoted to conventional gelatin desserts containing commercial grades of gelatin which require hot, and preferably boiling water for complete solution of the gelatin during preparation. As the setting time is prolonged to the extent that the solution must be cooled to gelation temperatures, a great deal of advantage is initially obtained by employing gelatin which is soluble in water at room temperature. So-called "amorphous" gelatin, obtained by drying a solution of gelatin directly from the sol state without allowing gelation to take place, provides a gelatin which is soluble in water at 20° C. When this gelatin is dissolved in water at 20° C., setting time is reduced to 140 minutes with a 1.0 package load weight and to 20 minutes with 2.0 package load weights. However, the disadvantage of unacceptably high Dessert Bloom remains, and the Dessert Bloom of the 2.0 package load weight dessert is as high as 75 after 42 hours of standing.

A technique of preparation which reduces the time required for gelation is the "ice cube" technique. Following this technique, the dessert composition, including gelatin, sugar, acid, buffer salts, color and flavor, is dissolved in ½ of the required amount of water, at a temperature of 70°–100° C. The remainder of the water required is then added in the form of an excess amount of ice cubes. The ice cubes are stirred with the solution for 1.5 to 3 minutes, the time calculated to provide, through melting of the ice, the total water requirement of the dessert. When the solution begins to thicken, the ice is removed. In this manner, the solution is cooled at a very rapid rate, and a very substantial decrease in setting time results. For example, a dessert containing 1.0 package load weight of gelatin, prepared according to this method, sets to an acceptable gel within 40 minutes, while the dessert containing 2.0 package load weights sets almost instantly, i.e., before the ice can be removed. 1.5 package load weights of gelatin provide a dessert which will set within 5 minutes. Where this technique is employed, 1.5 package load weights is preferred. In this case, as in the preceding discussion, the increased package load weight results in gels which develop an unacceptably high gel strength on standing.

The decreased setting time obtained by using the greater package load weights can be had without an increase in gel strength on standing by adding a proteolytic enzyme to the solution of the gelatin before the onset of gelation. The enzyme does not materially interfere with the setting rate but once the gelatin has set, the action of the enzyme becomes apparent. It is not definitely known whether the enzyme acts by destroying the gel previously formed or by destroying the gelling ability of the ungelled gelatin, or both. The effect is thought to be a combination of both factors. In any event, the presence of a proteolytic enzyme in the system prevents the gel from becoming tough and rubbery.

In the case of gelatin dessert compositions, it is generally preferred that a dry preparation of the enzyme be mixed with the gelatin.

The enzymes which have been found to be suitable for use according to this invention include pepsin, papain, macin, ficin, asclepain, bromelin, chymotrypsin, trypsin, rennin, and the like. These enzymes are derived from a variety of natural sources, including the digestive tracts of animals and various vegetable materials. Also included are the proteolytic enzymes obtained from bacteria, fungi, and similar microorganisms. Preparations of many of these enzymes are available commercially in the form of dry powders or in liquid preparations. These commercial products are available in various degrees of activity. Pepsin is marketed according to a National Formulary standard which is expressed in terms relative to the ability of the pepsin to hydrolyze a given amount of egg albumin. For example, where the strength of the pepsin preparation is given as 1:3000, one gram of this preparation will completely digest 3000 gms. of egg albumen under optimum conditions. The activity of most of the other enzymes are related to the activity of pepsin, or are stated on the same basis as pepsin. The gel strength adjustment desired is brought about by balancing of the level of enzyme, the gel storage conditions, and the amount and quality of gelatin employed.

One important factor to be controlled is the pH of the solution in which the enzyme is allowed to act. The optimum pH in this respect varies with the enzyme employed. Pepsin, for example, has an optimum pH for proteolytic activity of from 1.5 to 2.5, while trypsin has an optimum pH of from 7.5 to 9.0. The enzyme usually exhibits a lesser degree of activity as the pH of the medium is varied from the optimum.

In gelatin desserts, it is preferred that the enzyme pepsin be employed because of its ready commercial availability, its relative purity and its consistent performance. As an additional reason, gelatin desserts on reconstitution, generally have a pH of from 3.0 to 3.5, and this is near the optimum pH for pepsin activity. Some measure of care must be taken, however, when pepsin is employed because it is irreversibly inactivated at a pH above 7 and, therefore, cannot be employed in or subjected to alkaline conditions. Also, it is subject to irreversible heat inactivation particularly in the presence of moisture. At the same time, increases in temperature up to that of inactivation cause an increase in the activity of the enzyme. It is important, therefore, that these considerations be kept in mind when determining the level at which the pepsin is employed and when prescribing the procedure by which the gelatin dessert is prepared. The optimum temperature for pepsin activity is about 37° C. and the rate of proteolysis caused by this enzyme decreases as the temperature is lowered from this optimum. The effect of a higher temperature is to increase the rate of proteolysis until inactivation temperatures, i.e. 60–80° C., are reached. At refrigerator temperatures, i.e., about 5° C., proteolytic activity is greatly diminished.

Given optimum pH and temperature conditions, the pepsin continues to cause a breakdown of the gelatin until the supply of gelatin is exhausted. The pepsin acts as a catalyst, and does not enter the reaction directly. Therefore, if the pepsin is allowed to take its full course, the gel strength of the dessert soon falls below the desirable range and the gel is finally completely destroyed. For example, a gelatin dessert containing pepsin completely breaks down after a 24 hour period of standing at room temperature. It is therefore essential that the enzyme be inactivated or retarded in its activity by means of refrigeration or otherwise, after the desired degree of adjustment in gel strength has been obtained.

The following table illustrates the amount of pepsin required to provide a gelatin dessert having a pH of 3.2 with a Dessert Bloom within the range of 9–26 after 18 hours at 10° C. The gelatin employed here has a Standard Bloom of 240.

TABLE I

| Package Load Weight | Gms. of Gelatin | Milligrams of pepsin (1#3000) per gm. of gelatin |
| --- | --- | --- |
| 1.00 | 7.5 | |
| 1.25 | 10.4 | 1–4 |
| 1.50 | 11.3 | 5–20 |
| 1.75 | 13.1 | 20–35 |
| 2.00 | 15.0 | 40–60 |

The weight of gelatin per package load weight varies with the Standard Bloom of the gelatin employed. For example, where gelatin of 240 Standard Bloom is employed, approximately 8 gms. of gelatin are needed to make up one package load weight. On the other hand, where 100 Standard Bloom gelatin is employed, about 13 gms. of gelatin are necessary to make up one package load weight. This variation in the total amount of gelatin employed to make up a package load weight has some effect on the level of pepsin required, somewhat greater amounts of pepsin being required, with low Standard Bloom gelatins to provide the same benefit.

In order to further illustrate the process and products of this invention, the following detailed examples are given:

*Example 1*

Tanner's stock consisting of trimmings of cowhide, calf skin, and the like is limed in the usual manner. After 2–3 months, the stock is neutralized by the addition of hydrochloric acid and extracted at a pH 7. The gelatin solution thus extracted is dried in gelled blocks and ground. The gelatin powder obtained has a Standard Bloom of 255 (as determined by the procedure set forth in I & E Chemistry, Analytical Editions, volume II, page 348 on a 6% solution of this gelatin). Empirical determination indicates that 7.5 gms. of this gelatin when combined with the remaining ingredients of a gelatin dessert composition in one package quantities will provide a gel of 18 Bloom after 18 hours at 10° C. Gelatin desserts prepared in the usual manner from the gelatin described in this example will gel after about 3–4 hours in a refrigerator as indicated above.

In the following three examples, 1.0 package load weight indicates 7.5 gms. of the above described gelatin.

Example 2

A gelatin dessert composition is formulated employing the following ingredients in the indicated amounts:

| Ingredient | Grams |
|---|---|
| Gelatin (1.75 package load weights of the gelatin described in Example 1) | 13.125 |
| Sucrose | 75.000 |
| Citric Acid | 2.480 |
| Sodium Chloride | 0.430 |
| $NaH_2PO_4$ | 0.215 |
| $Na_2HPO_4$ | 0.215 |
| Pepsin (1:3000—National Formulary standard) (basis—25 mg. pepsin per gm. gelatin) | 0.328 |

The composition described above is prepared by adding 473 cc. of warm water (50° C.) to the dry mixture, and stirring the solution until the gelatin is thoroughly dissolved. The solution is then placed in a refrigerator at 10° C. A gel is formed within 120 minutes. After 18 hours of standing at 10° C., the dessert has a Dessert Bloom of 20. After 88 hours under the same conditions, the dessert has a Dessert Bloom of 10. In both cases, the gel strength is within acceptable limits.

This example illustrates the decrease in setting time obtained through the use of 1.75 load weights of gelatin. The use of pepsin in this example brings the gel strength within acceptable limits.

Example 3

A gelatin dessert composition is formulated employing the following ingredients in the indicated amounts:

| Ingredients | Grams |
|---|---|
| Gelatin (2.0 package load weights of the gelatin described in Example 1) | 15.000 |
| Sucrose | 75.000 |
| Citric Acid | 2.480 |
| Sodium Chloride | 0.430 |
| $NaH_2PO_4$ | 0.215 |
| $Na_2HPO_4$ | 0.215 |
| Pepsin (1:3000—National Formulary standard) | .825 |

The composition described above is prepared by adding 473 cc. of warm water (50° C.) to the dry mixture and stirring the solution until the gelatin is thoroughly dissolved. The solution is then placed in a refrigerator at 10° C. The dessert has a Dessert Bloom of 23 after 18 hours and 19 after 42 hours at 10° C.

This example illustrates a composition wherein a decrease in setting time is obtained through the use of 2.0 load weights of gelatin, combined with a proteolytic enzyme.

Example 4

| Ingredients | Grams |
|---|---|
| Gelatin (1.5 package load weights of the gelatin described in Example 1) | 11.250 |
| Sucrose | 75.000 |
| Citric Acid | 2.480 |
| Sodium Chloride | 0.430 |
| $NaH_2PO_4$ | 0.215 |
| $Na_2HPO_4$ | 0.215 |
| Pepsin (1:3000—National Formulary standard) | .135 |

The composition of this example is prepared by adding 236 cc. of water at 60° C. The solution is stirred until the gelatin is dissolved, whereupon 8–10 standard size ice cubes are added to the solution. This mixture is then stirred for 1½–3 minutes, or until the solution begins to thicken. At this point, the unmelted ice cubes are removed. On standing for 5 minutes, an eatable gel is formed. The dessert is then placed in a refrigerator at 10° C. After standing for 18 hours, the gelatin dessert continues to have a gel strength within the edible range, viz., 24 Dessert Bloom, and after a 72 hour period of standing, the dessert has a Dessert Bloom of about 18, which is within the acceptable range.

Example 5

Amorphous gelatin which is intrinsically cold water soluble is prepared in the following manner. A 15% solution of 250 Standard Bloom acid extracted gelatin is prepared and maintained at 50° C. The solution is then fed to a Buflovak drum dryer of the atmospheric type, manufactured by the Blaw-Knox Company, Buffalo, New York. The dryer is operated at a temperature equivalent to steam under the pressure of 15 lbs. per sq. inch gauge. The doctor blade of the dryer is adjusted to remove the gelatin immediately after drying is completed. The dried product is removed from the drum and ground to a particle size of through 60 but on 70 standard mesh screen. Empirical determination indicates that 10 gms. of this gelatin when combined with the remaining ingredients of the gelatin dessert composition in one package quantities will provide a gel of 18 Dessert Bloom after 18 hours at 10° C. In the following example, 1.0 package load weight indicates 10 gms. of the above described product.

Example 6

| Ingredients | Grams |
|---|---|
| Gelatin (1.5 package load weights of the gelatin described in Example 5) | 15.000 |
| Sucrose | 75.000 |
| Citric Acid | 2.480 |
| Sodium Chloride | 0.430 |
| $NaH_2PO_4$ | 0.215 |
| $Na_2HPO_4$ | 0.215 |
| Pepsin (1:3000 National Formulary standard) | .180 |

In preparing the gelatin dessert described above, 473 cc. of water at room temperature (20° C.) are added to the dry mixture with a slight amount of stirring. The composition is completely dissolved within 2 minutes and is thereafter placed in a refrigerator at 10° C. After 90 minutes, the gelatin dessert has set to a gel and is ready to eat. On further standing for an 18 hour period, the gel has a Dessert Bloom of about 22.

While this invention has been described with particular reference to the above examples, it should be understood that the invention is not limited thereto and reference should be had to the appended claims for a definition of the limits of the invention.

What is claimed is:

1. A gelatin dessert composition having a short setting time on reconstitution comprising gelatin and a proteolytic enzyme, said gelatin being present in more than a one package load weight quantity and said enzyme being present in an amount sufficient to adjust the gel to the desired strength.

2. A gelatin dessert composition having a decreased setting time on reconstitution comprising gelatin and pepsin, said gelatin being present in at least a 1.25 package load weight quantity and the pepsin being present in an amount sufficient to adjust the gel strength after 18 hours of standing at 10° C. to from 10 to about 26 Bloom.

3. A gelatin dessert composition having a short setting time on reconstitution comprising gelatin and pepsin, said gelatin being present in more than 1.0 package load weight quantity and said pepsin being present in an amount related to the gelatin as follows:

| Package Load Weight of Gelatin | Units of Pepsin Per Gram of Gelatin |
|---|---|
| 1.25 | 1–4 |
| 1.50 | 5–20 |
| 1.75 | 20–35 |
| 2.00 | 40–60 | one unit of pepsin being equivalent to one milligram of pepsin having a strength of 1:3000 according to the National Formulary standard, and the higher levels of pepsin within a given range being used with gelatin of lower Standard Bloom.

4. A gelatin dessert composition having a short setting time on reconstitution comprising gelatin and pepsin, said gelatin being of about 250 Standard Bloom and being present in more than a 1.0 package load weight quantity, and said pepsin being present in an amount related to the gelatin as follows:

| Package Load Weight of Gelatin | Units of Pepsin Per Gram of Gelatin |
|---|---|
| 1.25 | 2 |
| 1.50 | 2 |
| 1.75 | 25 |
| 2.00 | 45 | one unit of pepsin being equivalent to one milligram of pepsin having a strength of 1:3000 according to the National Formulary standard.

5. A gelatin dessert gel comprising gelatin in at least 1.25 package load weight quantities and a proteolytic enzyme in amount sufficient to adjust the gelatin to the desired strength.

6. A gelatin dessert gel comprising gelatin and pepsin, said gelatin being present in more than 1.0 package load weight quantity and said pepsin being present in an amount related to the gelatin as follows:

| Package Load Weight of Gelatin | Units of Pepsin Per Gram of Gelatin |
|---|---|
| 1.25 | 1-4 |
| 1.50 | 5-20 |
| 1.75 | 20-35 |
| 2.00 | 40-60 | one unit of pepsin being equivalent to one milligram of pepsin having a strength of 1:3000 according to the National Formulary standard, and the higher levels of pepsin within a given range being used with gelatin of lower Standard Bloom.

References Cited in the file of this patent
UNITED STATES PATENTS

| 1,902,415 | Monrad | Mar. 21, 1933 |
| 2,418,847 | Musher | Apr. 15, 1947 |
| 2,500,179 | Hinz et al. | Mar. 14, 1950 |

UNITED STATES PATENT OFFICE

CERTIFICATE OF CORRECTION

Patent No. 2,915,402                                      December 1, 1959

Joseph H. Cohen

It is hereby certified that error appears in the printed specification of the above numbered patent requiring correction and that the said Letters Patent should read as corrected below.

Column 1, line 28, for "compositionr" read -- composition --; column 4, Table I, third column thereof, in the heading, third line, for "(1#3000) per" read -- (1:3000) per --; column 7, in the table, second column thereof, under the heading, "Units of Pepsin Per Gram of Gelatin", second line, for "2" read -- 8 --.

Signed and sealed this 3rd day of May 1960.

(SEAL)
Attest:

KARL H. AXLINE
Attesting Officer

ROBERT C. WATSON
                                                                                             Commissioner of Patents